(12) United States Patent
DiGiulio et al.

(10) Patent No.: US 12,151,200 B2
(45) Date of Patent: Nov. 26, 2024

(54) TREATMENT OF BIOGAS BY PRESSURE SWING ADSORPTION

(71) Applicant: UOP LLC, Des Plaines, IL (US)

(72) Inventors: Christopher DiGiulio, Elmhurst, IL (US); Gaurav Srivastava, Fatehgarh (IN); Shubhra J Bhadra, Des Plaines, IL (US); Krishna Mani, Madurai (IN)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 18/399,282

(22) Filed: Dec. 28, 2023

(65) Prior Publication Data

US 2024/0226798 A1  Jul. 11, 2024

Related U.S. Application Data

(60) Provisional application No. 63/436,511, filed on Dec. 31, 2022.

(51) Int. Cl.
*B01D 53/02* (2006.01)
*B01D 53/04* (2006.01)
*B01D 53/047* (2006.01)

(52) U.S. Cl.
CPC ..... *B01D 53/0476* (2013.01); *B01D 53/0462* (2013.01); *B01D 2257/104* (2013.01); *B01D 2257/108* (2013.01); *B01D 2257/304* (2013.01); *B01D 2257/502* (2013.01); *B01D 2257/504* (2013.01); *B01D 2257/80* (2013.01); *B01D 2258/05* (2013.01)

(58) Field of Classification Search
CPC ............ B01D 53/0476; B01D 53/0462; B01D 2257/104; B01D 2257/108; B01D 2257/304; B01D 2257/502; B01D 2257/504; B01D 2257/80; B01D 2258/05
See application file for complete search history.

(56) References Cited

U.S. PATENT DOCUMENTS

| 4,681,612 A | * | 7/1987 | O'Brien | ............... | B01D 53/229 |
| | | | | | 62/929 |
| 2008/0308769 A1 | * | 12/2008 | Marty | ................... | B01D 53/04 |
| | | | | | 252/373 |

(Continued)

FOREIGN PATENT DOCUMENTS

| JP | 2008045060 A | 2/2008 |
| WO | 2022087755 A1 | 5/2022 |

OTHER PUBLICATIONS

Carlos A. Grande, "Biogas to Fuel by Vacuum Pressure Swing Adsorption I. Behavior of Equilibrium and Kinetic-Based Adsorbents", May 23, 2007, Publisher: Industrial & Engineering Chemistry Research.

(Continued)

*Primary Examiner* — Christopher P Jones
(74) *Attorney, Agent, or Firm* — Paschall & Associates, LLC; Mark Goldberg

(57) ABSTRACT

A process is provided for purification of biogas to produce biomethane. The biogas is treated in a pressure swing adsorption unit to remove carbon dioxide and water. Other impurities including oxygen, hydrogen and carbon monoxide may be removed by an additional adsorption bed. The adsorption beds may be single stage or two-stage VPSA or PSA adsorption beds.

19 Claims, 2 Drawing Sheets

(56) References Cited

U.S. PATENT DOCUMENTS

| | | | |
|---|---|---|---|
| 2011/0185896 A1* | 8/2011 | Sethna | C10L 3/104 |
| | | | 95/98 |
| 2011/0189746 A1* | 8/2011 | Mitariten | B01D 53/0462 |
| | | | 435/167 |
| 2012/0024157 A1* | 2/2012 | Maheshwary | B01D 53/047 |
| | | | 96/133 |
| 2012/0180389 A1 | 7/2012 | Knaebel | |
| 2014/0298992 A1* | 10/2014 | Carruthers | B01D 53/04 |
| | | | 502/437 |
| 2018/0200662 A1* | 7/2018 | Thompson | B01D 53/053 |
| 2023/0183064 A1* | 6/2023 | Foody | C10K 1/005 |
| | | | 423/220 |
| 2024/0131470 A1* | 4/2024 | Pere | F25J 3/067 |

OTHER PUBLICATIONS

Search Report and Written Opinion for PCT/US2023/085982 dated May 3, 2024.

Mohammad Azadi Tabar, "A multicolumn vacuum pressure swing adsorption biogas upgrading process for simultaneous CO2 and N2 separation from methane: Exergy and energy analysis", Aug. 13, 2022, Publisher: Energy Conversion and Management.

\* cited by examiner

TREATMENT OF BIOGAS BY PRESSURE SWING ADSORPTION

This application claims priority to U.S. application 63/436,511 filed Dec. 31, 2022.

Several factors including carbon neutrality, net zero commitments, favorable Government policy support and a general sense of sustainability have pushed the energy sector to a transition away from carbon intensive fuels, technologies, and products to a low carbon alternative. One such low cost, carbon negative fuel is biogas. Biogas, in its raw form is a mixture of $CH_4$ and $CO_2$ with minor quantities of co-eluting impurities such as $H_2S$, CO, $H_2$, $N_2$, and $O_2$. This gas is naturally formed due to anaerobic decomposition or fermentation of organic matter. This is kinetically a slow process (20-40 days for production) however, as the reactions are mediated by microbes, the selectivity towards $CH_4$ and $CO_2$ is very high. Typically, the composition is 50/50 each (mole % $CH_4$ and $CO_2$) with a 5-10% variation on both sides due to nature of feedstock.

However, this gas mixture has limited direct use as an alternative to its fossil cousin, i.e., natural gas due to presence of higher quantities of $CO_2$ which is inert and has no energy value. There are a number of separation technologies (pressure swing adsorption (PSA), physical solvent scrubbing, chemical solvent scrubbing, cryogenic fractionation, polymeric membranes, etc.) for separating $CO_2$ from $CH_4$. Nevertheless, the PSA platform has a larger user base as an effective and reliable technology for its separation as evident in mature biogas markets such as Germany, France, etc. Although PSA technology is in the forefront of biogas separation applications, it has its own limitations such as the need for a robust $H_2S$ pre-treatment system, tail gas recycling for improving methane recovery, vacuum operation for meeting target methane purity (>95%) and limited flexibility to control the $O_2$ and CO as per the evolving technical specifications.

This disclosure provides a solution to the problem of $O_2$, $H_2$ and CO slipping from a PSA unit. In a biogas plant, due to variations in feedstocks getting processed in the upstream fermenter and its process operating conditions, it is highly likely to have varying compositions of $O_2$, $H_2$ and carbon monoxide in the biogas. Often the specification requires a tighter specification (<0.5 mole %) on these components in the purified biogas, also known as biomethane. PSA units have limited capability to handle this variation in content.

SUMMARY

A process is provided for treatment of a biogas comprising sending the biogas stream to a vacuum pressure swing adsorption (VPSA) unit to remove carbon dioxide to produce a cleaned biogas stream. An additional adsorbent bed such as a temperature swing adsorption unit may be located downstream from the VPSA unit to remove hydrogen, oxygen, carbon monoxide as well as any extra water and carbon dioxide that may remain or have been generated in the process. A single stage VPSA flow scheme may be used. However, in other embodiments two stage PSA or two stage VPSA flow schemes may be used. In the first PSA unit bulk carbon dioxide and all of the hydrogen sulfide and water is removed. Then in the second VPSA unit there is final purification with removal of remaining carbon dioxide and most oxygen and nitrogen gas.

DETAILED DESCRIPTION

A process of treatment of a biogas stream is provided wherein the biogas stream comprises methane, carbon dioxide and other impurities, said process comprising sending said biogas stream to a vacuum pressure swing adsorption (VPSA) unit to remove carbon dioxide, water and hydrogen sulfide to produce a cleaned biogas stream. The process may further comprise sending the cleaned biogas stream to a treatment unit to remove hydrogen, oxygen, carbon dioxide and water. The treatment unit may be a temperature swing adsorption unit containing an adsorbent or a catalyst. The biogas stream may be first sent to a hydrogen sulfide removal system to remove hydrogen sulfide and then sent to said VPSA unit. The hydrogen sulfide removal system may be selected from a physical adsorption unit, a chemical adsorption unit or a bio-desulfurization unit. The VPSA unit may remove hydrogen sulfide from the biogas stream. There may be a PSA unit that is a two-stage unit comprising a first stage comprising a PSA unit and a second stage comprising a PSA unit. A single vacuum producing machine may produces the change in pressure for each of the two stages. The evacuation step time from each train by this vacuum producing machine may be matched in each unit to maintain continuous operation. A tail gas may be produced comprising a stream rich in carbon dioxide and some unrecovered methane. A first portion of the tail gas may be recycled to be combined with the biogas stream and sent to the VPSA unit. A second portion of the tail gas may be sent as a vent gas. The water and carbon dioxide may be sent as a vent gas. The cleaned biogas stream may be compressed and sent as a product comprising methane. The biogas may be sent through a pressure swing adsorption (PSA) unit. the first PSA unit is about 5-10 bars (absolute) and pressure in said second PSA unit is about 10-20 bars (absolute). The first PSA unit is for bulk $CO_2$ and all $H_2S$ and water removal and said second PSA is for final purification by removal of remaining $CO_2$ and a majority of oxygen and nitrogen. The first PSA unit may be an equilibrium PSA and said second PSA unit may be either an equilibrium PSA or a kinetic PSA. All of the tail gas may be recycled to the biogas stream. The temperature swing adsorption unit is located downstream of either the first PSA unit or the second PSA unit.

Figure 1:
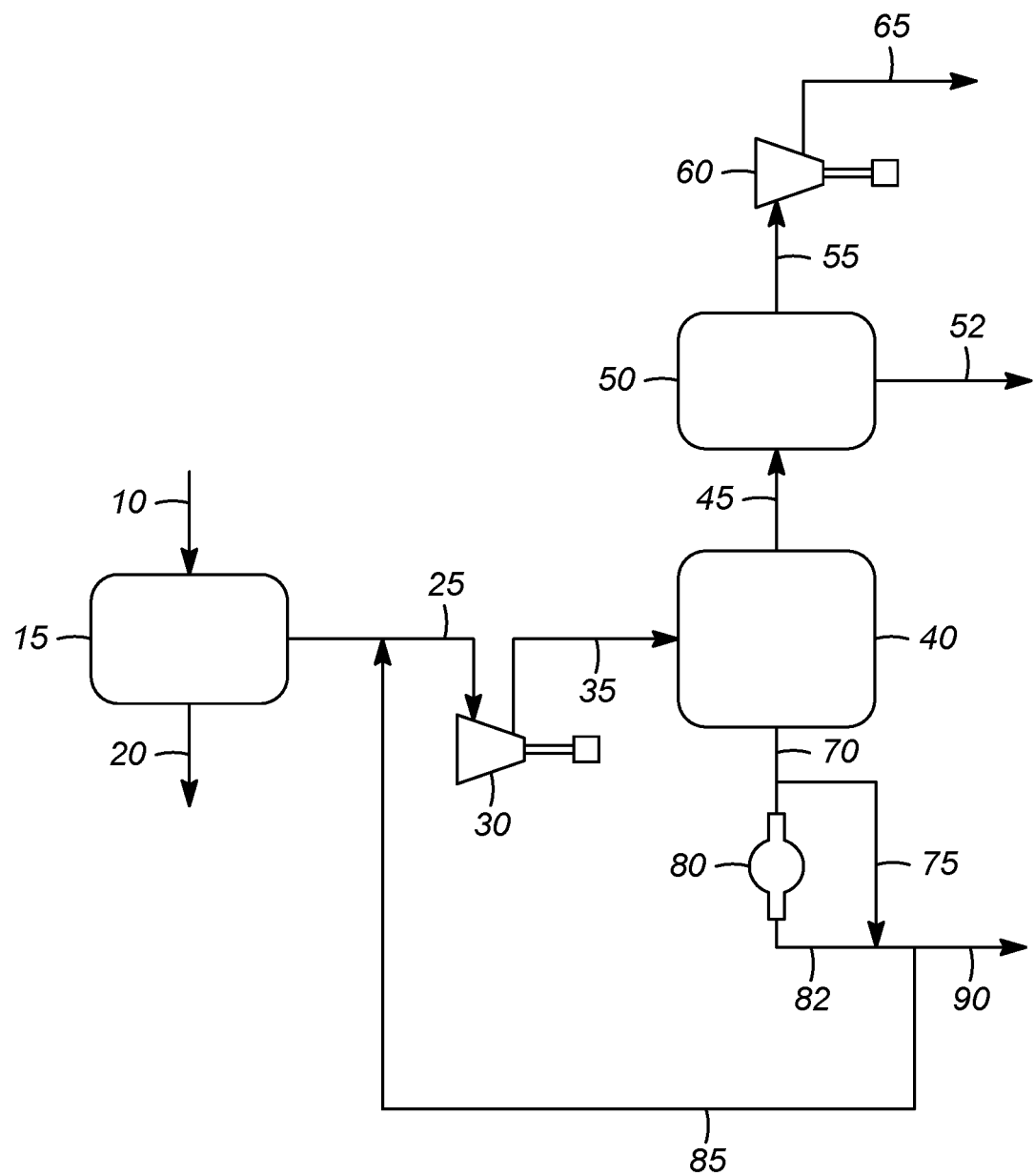
FIG. 1 shows a flow scheme including a vacuum swing adsorption unit and a temperature swing adsorption unit for removing impurities from a biogas stream.

In the disclosure, FIG. 1 shows the base scheme of a VPSA unit. In this configuration, the raw biogas is cooled in a cooler to remove the free water. Later, the water free biogas is subjected to a $H_2S$ removal unit operation. In some cases, it is an adsorbent bed and in some other cases it can be a solvent or biological desulfurization solutions. The $H_2S$ free biogas (<100 wt ppm) is sent to a vacuum pressure swing adsorption (VPSA) unit. "V" stands vacuum that is deployed to remove the contaminants from the beds during the desorption cycle. The pure biomethane comes from the unit during the adsorption cycle and its pressure is very close to the feed pressure. The typical adsorbents that are deployed in the VPSA units are proven for the removal of moisture such as silica gels. Furthermore, a layer of shape selective zeolites such as Na Y are used for the removal of $CO_2$ from $CH_4$. The removal is aided due to their difference in kinetic diameter. Nevertheless, these adsorbents have very limited influence on separation of species such as $O_2$, $H_2$ and CO. To overcome this difficulty, in the proposed invention FIG. 2, the purified biomethane is sent to a downstream bed which is in close hydraulic coupling with VPSA unit. In this bed, adsorbents are loaded that have preferential activity to catalytically convert the $H_2$ and $O_2$ to water and CO to $CO_2$. The bed loadings in the vessel are arranged in such a way to limit the exothermic heat and associated temperature raise due to chemical combustion. Later, the formed water is removed in a conventional adsorptive drier using known materials such as 3A sieves, etc. In this way, the invention by disclosing a separately housed vessel with standard heat management equipment such as coolers downstream of VPSA provides independent process handles to biogas plant operators to pin-pointedly control the contaminant levels of $H_2$, $O_2$ and CO in the saleable biomethane.

In FIG. 1, a biogas stream 10 containing contaminants is sent to an adsorption bed 14 to remove hydrogen sulfide which exits in stream 20. A sulfur-free (less than 100 ppm sulfur) biogas stream 25 is sent to blower 30 into line 35 and then to a vacuum swing adsorption unit 40 to remove carbon dioxide and water. The adsorbent to remove water may be silica gel and the adsorbent to move the carbon dioxide may be NaY zeolite. The cleaned biogas stream 45 still contains hydrogen, carbon monoxide and oxygen is sent to an adsorbent bed such as a temperature swing adsorption unit 50 with the impurities exiting in line 52. The biogas stream then exits in line 55 to a compressor 60 and then the cleaned biogas product 65 exits. A bottom stream 70 containing impurities exits and a portion is sent through vacuum pump 80 or bypassing the vacuum pump in stream 75. A portion of the combination of streams 75 and 82 exits as a tail gas 90 with a second portion being in recycle stream 85 to be combined with sulfur-free biogas stream 25.

Figure 2:
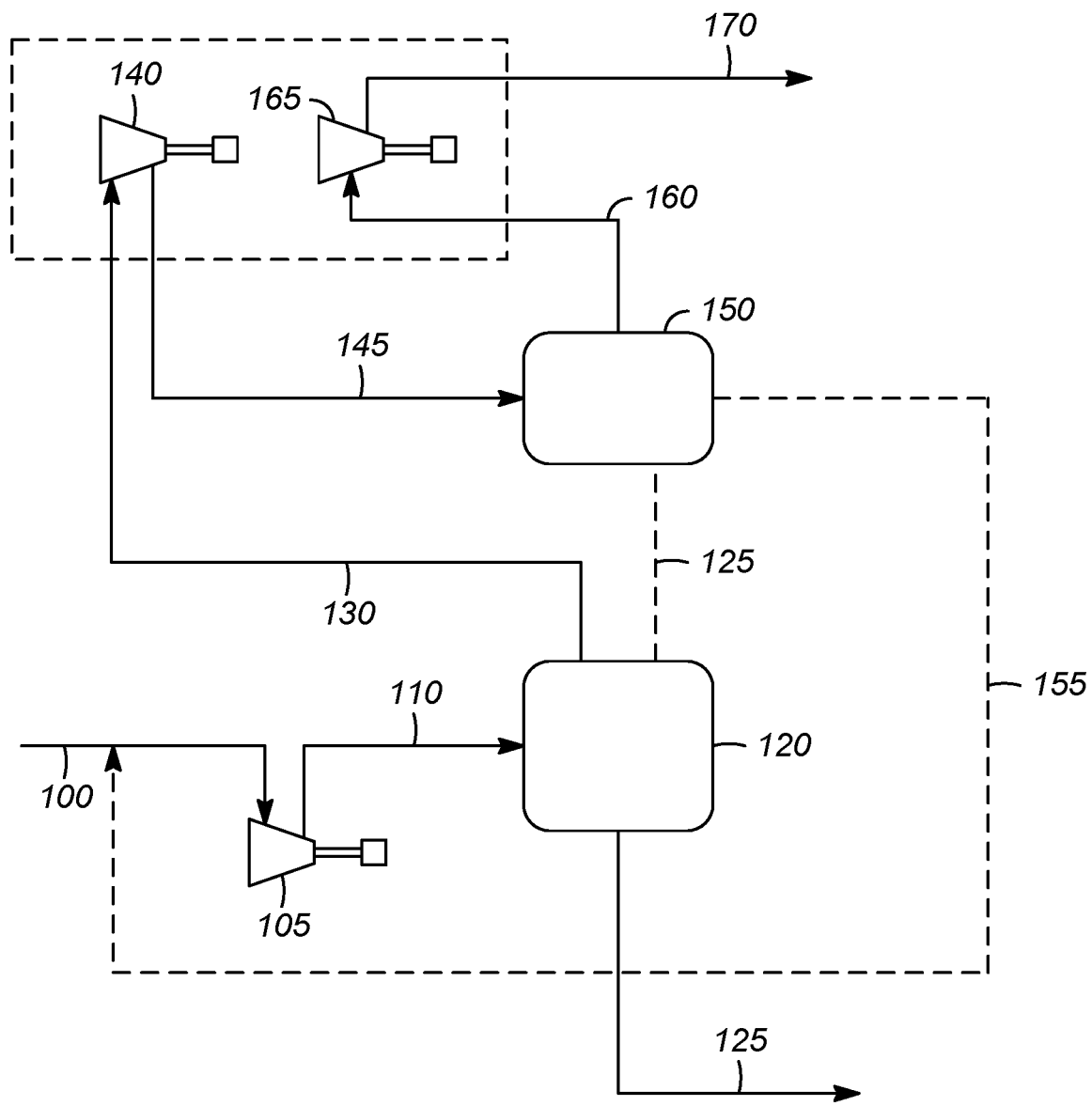
FIG. 2 shows an alternative embodiment with two stage vacuum swing adsorption units for removing impurities from a biogas stream.

In FIG. 2 a biogas stream 100 is compressed in compressor 105 and then the compressed biogas stream 110 is sent to a first PSA unit 120 for bulk removal of carbon dioxide and removal of all water and hydrogen sulfide. These impurities are shown as exiting in a bottom tail gas stream 125. The treated biogas stream 130 may be compressed in a second compressor 140 and then the treated compressed biogas stream is sent to a second PSA unit 150 for final purification through removal of any remaining carbon dioxide as well as mot of the oxygen and nitrogen. These impurities are shown as being sent in line 155. The methane product 160 is then compressed by a third compressor 165 and exits as a methane product stream 170. Also shown is that in some embodiments, the treated biogas stream from first PSA unit 120 may be sent directly to second PSA unit 150 without passing through a compressor.

EXAMPLE

The feed composition was calculated at different points in the flow scheme explained herein. In Table 1 is shown the composition of a fresh feed.

TABLE 1

| | | |
|---|---|---|
| Temperature | 104.0 | ° F. |
| Pressure | 43.456 | Psig |
| Molar Flow | 61.473856 | MMSCFD |
| Standard Gas Flow | 0.5599 | mol % |
| Comp Mole Frac (Oxygen) | 0.50 | mol % |
| Comp Mole Frac (Hydrogen sulfide) | 0.25 | mol % |
| Comp Mole Frac (Methane) | 59.35 | mol % |
| Comp Mole Frac (Carbon monoxide) | 0.50 | mol % |
| Comp Mole Frac (Carbon dioxide) | 36.41 | mol % |
| Comp Mole Frac (Hydrogen) | 0.90 | mol % |
| Comp Mole Frac (Nitrogen) | 0.50 | mol % |
| Comp Mole Frac (Water) | 1.60 | mol % |

TABLE 1-continued

| | | |
|---|---|---|
| Mass Flow | 1621.3 | lb/hr |
| Comp Mass Flow (Methane) | 585.3223 | lb/hr |

Table 2 shows the composition of the feed and recycle at the PSA inlet.

TABLE 2

| | | |
|---|---|---|
| Temperature | 103.2 | ° F. |
| Pressure | 43.319 | Psig |
| Mass Flow | 8321.2 | lb/hr |
| Molar Flow | 221.24358 | lbmole/hr |
| Comp Mole Frac (Oxygen) | 0.15 | mol % |
| Comp Mole Frac (Hydrogen sulfide) | 0.00 | mol % |
| Comp Mole Frac (Methane) | 20.76 | mol % |
| Comp Mole Frac (Carbon monoxide) | 0.17 | mol % |
| Comp Mole Frac (Carbon dioxide) | 76.92 | mol % |
| Comp Mole Frac (Hydrogen) | 0.26 | mol % |
| Comp Mole Frac (Nitrogen) | 0.15 | mol % |
| Comp Mole Frac (Water) | 1.60 | mol % |

Table 3 shows the composition of the PSA methane product stream.

TABLE 3

| | | |
|---|---|---|
| Temperature | 141.1 | ° F. |
| Pressure | 43.17 | Psig |
| Mass Flow | 618.9 | lb/hr |
| Molar Flow | 37.18 | lbmole/hr |
| Comp Mole Frac (Oxygen) | 0.82 | mol % |
| Comp Mole Frac (Hydrogen sulfide) | 0.00 | mol % |
| Comp Mole Frac (Methane) | 94.36 | mol % |
| Comp Mole Frac (Carbon monoxide) | 0.80 | mol % |
| Comp Mole Frac (Carbon dioxide) | 1.74 | mol % |
| Comp Mole Frac (Hydrogen) | 1.48 | mol % |
| Comp Mole Frac (Nitrogen) | 0.81 | mol % |
| Comp Mole Frac (Water) | 0.00 | mol % |

Table 4 shows the composition and properties of the methane product.

TABLE 4

| | | |
|---|---|---|
| Temperature | 104.0 | ° F. |
| Pressure | 3611.2 | Psig |
| Mass Flow | 592.5 | lb/hr |
| Molar Flow | 36.10 | lbmole/hr |
| Comp Mole Frac (Oxygen) | 0.00 | mol % |
| Comp Mole Frac (Hydrogen sulfide) | 0.00 | mol % |
| Comp Mole Frac (Methane) | 97.19 | mol % |
| Comp Mole Frac (Carbon monoxide) | 0.00 | mol % |
| Comp Mole Frac (Carbon dioxide) | 1.31 | mol % |
| Comp Mole Frac (Hydrogen) | 0.66 | mol % |
| Comp Mole Frac (Nitrogen) | 0.84 | mol % |
| Comp Mole Frac (Water) | 0.00 | mol % |

Table 5 shows the composition of the saturated biogas.

TABLE 5

| | | |
|---|---|---|
| Temperature | 104.0 | ° F. |
| Pressure | 43.456 | Psig |
| Molar Flow | 65.235149 | lbmole/hr |
| Comp Mole Frac (Oxygen) | 0.47 | mol % |
| Comp Mole Frac (Hydrogen sulfide) | 0.23 | mol % |
| Comp Mole Frac (Methane) | 55.93 | mol % |
| Comp Mole Frac (Carbon monoxide) | 0.47 | mol % |
| Comp Mole Frac (Carbon dioxide) | 34.31 | mol % |
| Comp Mole Frac (Hydrogen) | 0.85 | mol % |
| Comp Mole Frac (Nitrogen) | 0.47 | mol % |
| Comp Mole Frac (Water) | 7.27 | mol % |

Table 6 shows the composition after removal of hydrogen sulfide.

TABLE 6

| | |
|---|---|
| Temperature | 104.0 ° F. |
| Pressure | 43.319 Psig |
| Molar Flow | 61.243576 lbmole/hr |
| Comp Mole Frac (Oxygen) | 0.50 mol % |
| Comp Mole Frac (Hydrogen sulfide) | 0.00 mol % |
| Comp Mole Frac (Methane) | 55.57 mol % |
| Comp Mole Frac (Carbon monoxide) | 0.50 mol % |
| Comp Mole Frac (Carbon dioxide) | 36.54 mol % |
| Comp Mole Frac (Hydrogen) | 0.90 mol % |
| Comp Mole Frac (Nitrogen) | 0.50 mol % |
| Comp Mole Frac (Water) | 1.48 mol % |
| Mass Flow | 1614.7 lbmole/hr |

Table 7 shows the composition of the flow passing from the catalytic bed to the TSA unit.

TABLE 7

| | |
|---|---|
| Temperature | 335.2 ° F. |
| Pressure | 43.17 Psig |
| Molar Flow | 36.88 lbmole/hr |
| Comp Mole Frac (Oxygen) | 0.00 mol % |
| Comp Mole Frac (Hydrogen sulfide) | 0.00 mol % |
| Comp Mole Frac (Methane) | 95.13 mol % |
| Comp Mole Frac (Carbon monoxide) | 0.00 mol % |
| Comp Mole Frac (Carbon dioxide) | 2.56 mol % |
| Comp Mole Frac (Hydrogen) | 0.65 mol % |
| Comp Mole Frac (Nitrogen) | 0.82 mol % |
| Comp Mole Frac (Water) | 0.84 mol % |

SPECIFIC EMBODIMENTS

While the following is described in conjunction with specific embodiments, it will be understood that this description is intended to illustrate and not limit the scope of the preceding description and the appended claims.

A first embodiment of the invention is a process of treatment of a biogas stream wherein said biogas stream comprises methane, carbon dioxide and other impurities, said process comprising sending said biogas stream to a vacuum pressure swing adsorption (VPSA) unit to remove carbon dioxide, water and hydrogen sulfide to produce a cleaned biogas stream. An embodiment of the invention is one, any or all of prior embodiments in this paragraph up through the first embodiment in this paragraph further comprising sending the cleaned biogas stream to a treatment unit to remove hydrogen, oxygen, carbon monoxide, carbon dioxide and water. An embodiment of the invention is one, any or all of prior embodiments in this paragraph up through the first embodiment in this paragraph wherein said treatment unit is a temperature swing adsorption unit containing an adsorbent or a catalyst. An embodiment of the invention is one, any or all of prior embodiments in this paragraph up through the first embodiment in this paragraph. wherein said biogas stream is first sent to hydrogen sulfide removal system to remove hydrogen sulfide and then sent to said VPSA unit. An embodiment of the invention is one, any or all of prior embodiments in this paragraph up through the first embodiment in this paragraph wherein said hydrogen sulfide removal system is selected from a physical adsorption unit, a chemical adsorption unit or a biodesulfiurization unit. An embodiment of the invention is one, any or all of prior embodiments in this paragraph up through the first embodiment in this paragraph wherein said VPSA unit removes hydrogen sulfide from said biogas stream. An embodiment of the invention is one, any or all of prior embodiments in this paragraph up through the first embodiment in this paragraph An embodiment of the invention is one, any or all of prior embodiments in this paragraph up through the first embodiment in this paragraph wherein said VPSA unit is a two-stage unit comprising a first stage comprising a VPSA unit and a second stage comprising a PSA unit. An embodiment of the invention is one, any or all of prior embodiments in this paragraph up through the first embodiment in this paragraph wherein a single vacuum producing machine produces a vacuum for each of the two stages. An embodiment of the invention is one, any or all of prior embodiments in this paragraph up through the first embodiment in this paragraph wherein evacuation step time from each train by said vacuum producing machine is matched in each unit to maintain continuous operation. An embodiment of the invention is one, any or all of prior embodiments in this paragraph up through the first embodiment in this paragraph wherein a tail gas is produced comprising a stream rich in carbon dioxide and some unrecovered methane An embodiment of the invention is one, any or all of prior embodiments in this paragraph up through the first embodiment in this paragraph wherein a tail gas is produced comprising a stream rich in carbon dioxide and some unrecovered methane. An embodiment of the invention is one, any or all of prior embodiments in this paragraph up through the first embodiment in this paragraph wherein a tail gas is produced comprising a stream rich in carbon dioxide and some unrecovered methane. An embodiment of the invention is one, any or all of prior embodiments in this paragraph up through the first embodiment in this paragraph wherein a tail gas is produced comprising a stream rich in carbon dioxide and some unrecovered methane. An embodiment of the invention is one, any or all of prior embodiments in this paragraph up through the first embodiment in this paragraph wherein a first portion of said tail gas is recycled to be combined with said biogas stream and sent to said VPSA unit. An embodiment of the invention is one, any or all of prior embodiments in this paragraph up through the first embodiment in this paragraph wherein said cleaned biogas stream is compressed and sent as a product comprising methane. An embodiment of the invention is one, any or all of prior embodiments in this paragraph up through the first embodiment in this paragraph wherein said biogas is sent through a pressure swing adsorption (PSA) unit. An embodiment of the invention is one, any or all of prior embodiments in this paragraph up through the first embodiment in this paragraph wherein pressure in said first PSA unit is about 5-10 bars (absolute) and pressure in said second PSA unit is about 10-20 bars (absolute). An embodiment of the invention is one, any or all of prior embodiments in this paragraph up through the first embodiment in this paragraph wherein said first PSA unit is for bulk $CO_2$ and all $H_2S$ and water removal and said second PSA is for final purification by removal of remaining $CO_2$ and a majority of oxygen and nitrogen. An embodiment of the invention is one, any or all of prior embodiments in this paragraph up through the first embodiment in this paragraph wherein said first PSA unit is an equilibrium PSA and said second PSA unit is either an equilibrium PSA or a kinetic PSA. wherein all of said tail gas is recycled to said biogas stream. An embodiment of the invention is one, any or all of prior embodiments in this paragraph up through the first embodiment in this paragraph wherein a temperature swing adsorption unit is located downstream of either said first PSA unit or said second PSA unit.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process of treatment of a biogas stream wherein said biogas stream comprises methane, carbon dioxide and other impurities, said process comprising sending said biogas stream to a vacuum pressure swing adsorption (VPSA) unit to remove carbon dioxide, water and hydrogen sulfide to produce a cleaned biogas stream, and
sending the cleaned biogas to a temperature swing adsorption unit to remove hydrogen, oxygen, carbon monoxide, carbon dioxide and water.

2. The process of claim 1 wherein said temperature swing adsorption unit contains an adsorbent or a catalyst.

3. The process of claim 1 wherein said biogas stream is first sent to hydrogen sulfide removal system to remove hydrogen sulfide and then sent to said VPSA unit.

4. The process of claim 3 wherein said hydrogen sulfide removal system is selected from a physical adsorption unit, a chemical adsorption unit or a bio-desulfurization unit.

5. The process of claim 1 wherein said VPSA unit is a one stage or a two-stage unit.

6. The process of claim 5 wherein a single vacuum producing machine produces a vacuum for each of the two stages.

7. The process of claim 5 wherein an evacuation step time from the each stage by said vacuum producing machine is matched in the each stage to maintain continuous operation.

8. The process of claim 1 wherein a tail gas is produced comprising a stream rich in carbon dioxide and some unrecovered methane.

9. The process of claim 8 wherein a first portion of said tail gas is recycled to said VPSA unit.

10. The process of claim 9 wherein a second portion of said tail gas exits in a vent gas.

11. The process of claim 10 wherein said water and carbon dioxide exit in the vent gas.

12. The process of claim 1 wherein said cleaned biogas stream is compressed to provide a product comprising methane.

13. The process of claim 1 wherein said biogas is sent through a pressure swing adsorption (PSA) unit.

14. The process of claim 13 wherein pressure in a first PSA unit is about 5-10 bars (absolute) and pressure in a second PSA unit is about 10-20 bars (absolute).

15. The process of claim 14 wherein said first PSA unit is for bulk CO2 and all H2S and water removal and said second PSA is for final purification by removal of remaining CO2 and a majority of oxygen and nitrogen.

16. The process of claim 14 wherein said first PSA unit is an equilibrium PSA and said second PSA unit is either an equilibrium PSA or a kinetic PSA.

17. The process of claim 8 wherein all of said tail gas is recycled to said biogas stream.

18. The process of claim 14 wherein a temperature swing adsorption unit is located downstream of either said first PSA unit or said second PSA unit.

19. The process of claim 1 further comprising sending the cleaned biogas to a bed to catalytically convert the hydrogen and oxygen to water and carbon monoxide to carbon dioxide.

* * * * *